July 3, 1962   M. A. ROSENBERG   3,042,845
CAPACITOR STRUCTURE
Filed Aug. 10, 1959

INVENTOR.
MICHAEL A. ROSENBERG
BY Fulwider Mattingly & Huntley
Attorneys

United States Patent Office 3,042,845
Patented July 3, 1962

3,042,845
CAPACITOR STRUCTURE
Michael A. Rosenberg, Granada Hills, Calif., assignor to San Fernando Electric Manufacturing Company, San Fernando, Calif., a corporation of California
Filed Aug. 10, 1959, Ser. No. 832,752
6 Claims. (Cl. 317—242)

This invention relates to capacitors, and more particularly to unique means for minimizing the change in capacitance with temperature of rolled foil type capacitors.

A typical rolled foil type capacitor is formed of alternate strips of dielectric material and conductive metal foil, e.g., aluminum foil. Each of these strips is supplied on a respective spool, and their ends are led to a mandrel which is rotated to build up thereon a roll form of capacitor.

The type of dielectric material selected for rolled foil capacitors is determined from a variety of factors. For a particular circuit, the capacitor may be required to exhibit, in addition to the capacitance needed for the particular circuit design, a variety of dielectric characteristics, such as low dielectric absorption and high insulation resistance. In this connection, the dielectric strips are often formed of a material which has the desired properties, a range of selection being provided by strips made of different types of synthetic resins.

Although dielectric strips made of synthetic resin substances are preferred for use in rolled foil capacitors, capacitors constructed therewith are generally not too well suited for operation over a wide temperature range. Such dielectrics have an undesirably large temperature coefficient, which is largely responsible for the capacitor exhibiting undesired changes in capacitance throughout such temperature range. This means that at high temperatures, the capacitor expands radially to increase the overall size thereof, and at low temperatures it contracts radially with a consequent "loosening" of the dielectric material from the adjacent foil strips. Also, the dielectric material undergoes changes in molecular characteristics or activity. All such changes markedly affect the capacitance. Thus, even capacitors having dielectric strips with the smallest temperature coefficient are characterized by an undesirably wide variation in capacitance throughout a wide temperature range.

It will readily be appreciated that such capacitors often are employed in circuits and equipment in which the temperature environment varies considerably. This is particularly true in the cases of equipment carried in vehicles or aircraft maneuvering between high and low altitudes. Occasionally, stationary equipment will also be subject to extreme changes in temperature environment, e.g., as in equipment positioned at a desert installation where surrounding air temperatures are very high during the day and very low at night.

In many types of equipment, wherein rolled foil capacitors could be used, it is essential that any changes in capacitance of the capacitors used in circuits in the equipment be maintained at a minimum. Due to the characteristics of rolled foil capacitors, their use in many circuits is desired. However, because of their undesirably high temperature coefficients, they are often not considered for such uses.

It is an object of this invention to provide unique means for minimizing capacitance changes of rolled foil capacitors throughout any given temperature range.

It is another object of this invention to provide means for reducing the normal temperature coefficient of a rolled foil capacitor of the type employing a synthetic resin dielectric material.

A further object of this invention is to provide, for a rolled foil capacitor, means for mechanically controlling capacitance changes.

A still further object of this invention is to provide, for a rolled foil capacitor having a temperature coefficient that is high due to the use of synthetic resin dielectric materials, a strap surrounding the capacitor for mechanically resisting dimensional changes thereof and for effecting a capacitor structure characterized by a temperature coefficient smaller than that of the capacitor alone.

It is also an object of this invention to provide an improved capacitor structure having a minimum number of component parts of simple design and rugged construction.

The above and other objects and advantages of this invention will become apparent from the following description taken in conjunction with the accompanying drawing of illustrative embodiments thereof, and in which.

Figure 1:
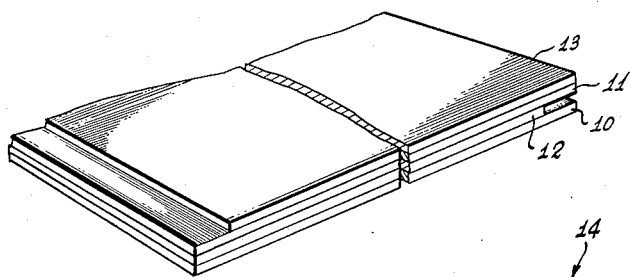
FIGURE 1 is a partial perspective view of a lay-up of alternate dielectric and metallic foil strips to be used in making a rolled foil capacitor.
Figure 2:
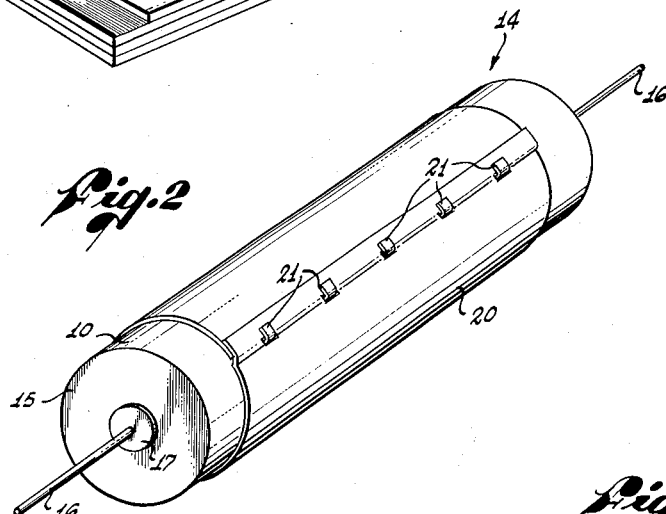
FIGURE 2 is a perspective view of an assembled rolled foil capacitor, showing a metallic strap mechanically secured to the outer surface of the capacitor, and showing the ends of the strap interconnected so as to insure that the strap is held in tension.

Referring to FIGURE 1, there is illustrated the end portions of a lay-up of alternate dielectric strips 10, 11 and conductive foil strips 12, 13. As previously indicated, these strips are wound on a mandrel, with the uppermost foil strip 13 being on the interior of the roll, i.e., the outer or lower dielectric strip 10 is the outer layer of the capacitor, as indicated in FIGURE 2.

It will be understood that FIGURE 1 illustrates the strips 10–13 magnified many times. In actual practice, both the dielectric and foil strips are extremely thin, i.e., on the order of 0.005-in. thickness.

As illustrated in FIGURE 1, the foil strips 12, 13 are staggered, so that when rolled with the dielectric strips 10, 11 to form a capacitor 14 (see FIGURE 2), the edges of the foil strips 12, 13 extend to the edges of the dielectric strips; alternatively, of course, the edges of the foil strips may extend slightly past the end of the dielectric strips. The edges of the respective foil strips 12, 13 at the opposite ends of the capacitor structure are connected by a metal coating, indicated at 15, and lead elements 16 for connection to an external circuit are secured, as by soldering, at 17, to the metallic coating 15.

As previously explained, depending upon the particular characteristics of the synthetic resin dielectric strips 10, 11, the conventional rolled foil capacitor structure is characterized by an undesirably high temperature coefficient. Referring to FIGURE 2, I provide a control parameter for such temperature coefficient, by means of an inelastic strap or band 20 surrounding the lateral surface of the capacitor. The ends of the band 20 are drawn and held together so as to be under tension. One method of holding the ends of the band 20 together, as shown, is to provide a plurality of spaced tabs 21 integral with one end of the band 20, such tabs 21 extending through aligned slots in the other end of the band. For locking, the tabs 21 are bent in the reverse direction to lie against the adjacent end of the band 20. Thus arranged, the edges of the foil and dielectric strips extend past the edges of the band sufficiently to avoid leakage capacitance between the band and the foil strips.

In accordance with my invention, the band 20 is formed of material, e.g., metal, having a temperature coefficient considerably smaller than that of the capacitor structure per se. The net effect is that the composite capacitor structure, i.e., the capacitor structure with the band 20 in place thereon, is characterized by a temperature coefficient that is considerably smaller than the temperature coefficient of the capacitor per se. How the band 20 effects this result will now be explained with reference to FIGURES 3 and 4.

Since the band 20 has a smaller temperature coefficient than the remainder of the capacitor structure, and since the band 20 surrounds the lateral surface of the capacitor structure, it effectively performs or serves as a mechanical barrier to control radial changes in the capacitor structure. It is believed that changes in radial dimension—expansion and contraction—constitute the primary reason for variations in capacitance with temperature.

Figures 3, 4:
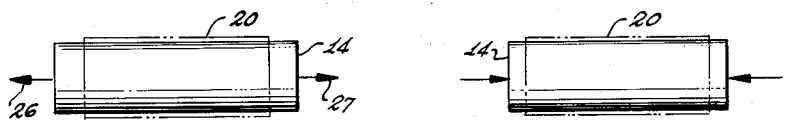
FIGURE 3 is a diagrammatic view of a rolled foil capacitor, showing directions of expansion of the capacitor at high temperatures, for aid in explaining the effectiveness of the strap of FIGURE 2 for minimizing such change.
FIGURE 4 is a diagrammatic view, similar to FIGURE 3, illustrating how the strap of FIGURE 2 serves to prevent the capacitor foil and dielectric strips from loosening at lower temperatures.

Referring to FIGURE 3, there is illustrated a longitudinal elevation view of the capacitor structure 14 surrounded by the band 20, which is illustrated in dotted lines. At high temperatures, i.e., at temperatures above normal or room temperature, the capacitor 14 of course tends to expand radially. However, due to the barrier presented by the band 20, such radial expansion is inhibited. Since the ends of the capacitor 14 are not restrained, the result is that the capacitor undergoes longitudinal expansion, as indicated by the arrows 26, 27. But since the band 20 prevents expansion of the capacitor 14 in the direction which normally is most likely to cause variations in capacitance, the overall effect is that of a capacitor having a much smaller temperature coefficient, i.e., the capacitance is more nearly constant at elevated temperatures.

When temperatures fall below normal or room temperature, the capacitor structure of course tends to contract. Referring to FIGURE 4, the band 20 also functions at such lower temperatures to prevent radial contraction effects on the capacitor 14. To understand this result, attention is directed to the fact that the band 20 has a much smaller temperature coefficient than the capacitor structure. The band 20 surrounding the capacitor in firm abutting relation is the portion that is initially exposed to a cooler environment. It thus functions to delay the cooling down of the capacitor structure because of its inherent low heat conduction properties.

Even if the capacitor is retained or continually operated in a cold environment, my invention minimizes changes in capacitance. This is believed to be due, in part at least, to the fact that the band is in gripping engagement therewith, i.e., under tension.

It will be apparent that at low temperatures the magnitude of radial contraction of the capacitor 14 by itself would be very small. The purpose of the band is to reduce the effects of such contraction. Since the band is firmly gripping the capacitor, it retains such gripping engagement when contracted, although to a lesser extent than at higher temperatures since the capacitor structure is contracted slightly more than the band. What this means is that the turns of foil and dielectric material are held firmly together, i.e., not allowed to "loosen" or pull away from each other so as to materially alter the spacing between the foil strips. Thus, the band 20 functions to keep the separation between the capacitor plates substantially constant, and thereby reduces the amount of change in capacitance that would occur without it.

Figure 5:
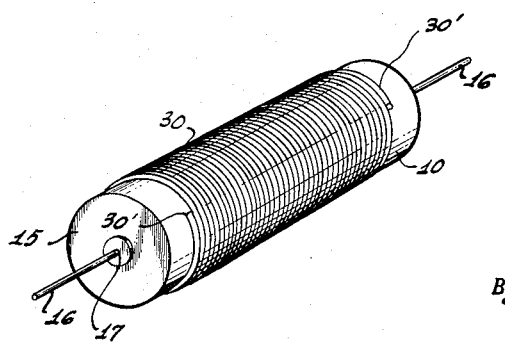
FIGURE 5 is a perspective view, similar to FIGURE 2, showing a wire wrapped around the outer surface of the capacitor to provide a band which serves the functions of the strap of FIGURE 2.

It will be apparent that there are numerous ways of forming the strap around the rolled foil capacitor. The band 20 of FIGURE 2 is shown as a solid length of metal. If desired, it could be formed of a series of parallel strips placed side by side along the capacitor, with each strip being provided with mating tongue and slot arrangements. Still another alternative is illustrated in FIGURE 5, wherein the capacitor is surrounded by a strap in the form of adjacent turns of a wire 30. The wire 30, as with the band 20, is wrapped around the capacitor so that all of the turns thereof are in tension, so as to snugly engage the capacitor. To secure the wire 30 in place so as to maintain this tension, the ends thereof, as indicated at 30', may be secured to the adjacent turn of the wire, as by soldering.

It is very important to apply the strap to insure that the barrier is supplied with the right tension. For example, assume that an order is received for a number of capacitors having a variety of characteristics, e.g., specific limitations on insulation resistance, dielectric absorption, and a particular temperature coefficient. A rolled foil capacitor is designed which will readily satisfy the requirements for dielectric absorption and insulation resistance, and which will come as close as possible to the specified temperature coefficient. If, as is so often the case, the particular temperature coefficient as specified by the customer is lower than it is possible to provide with the dielectric material that will satisfy the other two requirements, the next step is to select an element to be used for the strap which has a temperature coefficient below that called for by the specifications.

After selecting the desired element for the strap it must then be determined how tightly the element must be placed on the capacitor so that the composite structure will have the desired or specified temperature coefficient. To do this, I make use of the fact that the capacitors are designed to have a specific capacitance at normal or room temperature. I then place the strap around the capacitor at normal or room temperature, and, while measuring the capacitance, tighten the band until the capacitance of the capacitor is seen to vary slightly. I then relax the tension on the band until the capacitance is seen to be that required at the normal or room temperature, and secure the band in that position. Thereafter, the capacitor is subjected to a temperature cycle wherein it is ascertained that the capacitance falls within the prescribed limits at various points within the temperature range.

It will readily be understood that it is extremely important that the band not be placed on the capacitor too tightly or too loosely. If it is too tight, it will create internal stresses both in itself and in the capacitor. These stresses tend to relieve themselves, so that if the stresses are high to begin with, any appreciable expansion radially may force or cause a rupture of the band and the outer portion of the capacitor. If the band is placed around the capacitor too loosely, it of course has little or no effect in controlling the capacitance chances.

Although I have described my invention with reference to particular embodiments thereof, it will be seen that various modifications may be made without departing from the spirit and scope of my invention. Accordingly, I do not intend that my invention be limited, except as by the appended claims.

I claim:

1. A capacitor structure comprising: a capacitor rolled from alternate strips of conductive foil and dielectric material, wherein the characteristics of said dielectric material contribute to expansion and contraction of said capacitor transversely of the axis thereof in different temperature environments, said capacitor having a characteristic temperature coefficient; and a band surrounding the lateral surface of said capacitor, said band at room temperature snugly engaging said capacitor sufficiently to avoid changing its capacitance at that temperature, said band having a lower temperature coefficient than said capacitor.

2. A capacitor structure comprising: a cylindrical capacitor having a temperature coefficient such that changes in the radial dimension thereof occur at temperatures above and below a predetermined temperature; and a band surrounding said capacitor element, said band firmly embracing said capacitor so as to physically prevent the normal radial expansion thereof, whereby said band and said capacitor form a composite capacitor structure having a lower effective temperature coefficient than that of said capacitor, the engagement of said capacitor by said band being such that the capacitance exhibited by said capacitor alone at said predetermined temperature is maintained.

3. A capacitor structure comprising: a cylindrical foil capacitor formed of convolutions of alternate conductive foil strips and dielectric strips, said dielectric strips being made of a synthetic resin material, said capacitor having a temperature coefficent that helps give the capacitor a characteristic change in radial dimension at temperatures above and below a predetermined temperature; and means for effectively reducing said temperature coefficient including a sleeve snugly disposed around the lateral surface of said capacitor, said sleeve exerting slight radial compressive forces along said capacitor in all temperature environments in a predetermined temperature range above and below said predetermined temperature, said sleeve having a lower temperature coefficient than the temperature coefficient of said capacitor.

4. A capacitor structure comprising: a cylindrical foil capacitor formed of convolutions of alternate conductive foil strips and dielectric strips, said dielectric strips being made of a synthetic resin material, said capacitor having a temperature coefficent that helps give the capacitor a characteristic change in radial dimension at temperatures above and below a predetermined temperature; and means for effectively reducing said temperature coefficient including a sleeve snugly disposed around the lateral surface of said capacitor, said sleeve exerting slight radial compressive forces along said capacitor in all temperature environments in a range that includes said predetermined temperature, said sleeve at said predetermined temperature being stressed against said capacitor, said stress being less than that which would change the normal capacitance of said capacitor at said predetermined temperature.

5. A capacitor structure comprising: a cylindrical foil capacitor formed of convolutions of alternate conductive foil strips and dielectric strips, said dielectric strips being made of a synthetic resin material, said material having a temperature coefficient that helps give the capacitor characteristic changes in radial dimension and capacitance at temperatures above and below a predetermined temperature; and means for effectively reducing said temperature coefficient including a sleeve snugly disposed around the lateral surface of said capacitor, said sleeve exerting slight radial compressive forces along said capacitor in a predetermined range of temperature environments, said sleeve being formed of material having a lower temperature coefficient than said capacitor, said forces being made as great as possible without altering the desired capacitance at room temperature.

6. In combination: a capacitor element having a characteristic temperature coefficient which is manifested by expansion of said element under differing temperature conditions, said capacitor exhibiting a predetermined capacitance at a given temperature; and means for mechanically holding said element to prevent the normal expansion thereof, said means including a strap snugly embracing said capacitor element, said strap having a lower temperature coefficient than said capacitor element, said strap holding said capacitor under a compressive force at said given temperature such that said predetermined capacitance is exhibited by the combination of said capacitor element and said strap.

References Cited in the file of this patent

UNITED STATES PATENTS

| | | |
|---|---|---|
| 728,780 | Splitdorf | May 19, 1903 |
| 1,731,652 | Dubilier | Oct. 15, 1929 |
| 1,973,852 | Georgiev | Sept. 18, 1934 |
| 2,161,192 | Peterson | June 6, 1939 |
| 2,531,185 | Wurster | Nov. 21, 1950 |
| 2,892,139 | Salzberg | June 23, 1959 |

Notice of Adverse Decision in Interference

In Interference No. 93,836 involving Patent No. 3,042,845, M. A. Rosenberg, CAPACITOR STRUCTURE, final judgment adverse to the patentee was rendered Sept. 13, 1965, as to claims 1, 2, 3, 4, 5 and 6.

[*Official Gazette December 14, 1965.*]